US012801397B2

(12) United States Patent
Jekal et al.

(10) Patent No.: US 12,801,397 B2
(45) Date of Patent: Nov. 17, 2026

(54) ELECTRONIC DEVICE MOUNTED ON VEHICLE AND METHOD OF OPERATING THE SAME

(71) Applicant: Samsung Electronics Co., Ltd., Suwon-si (KR)

(72) Inventors: Heon Jekal, Suwon-si (KR); Jinwook Lee, Suwon-si (KR); Sanghwa Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 18/829,540

(22) Filed: Sep. 10, 2024

(65) Prior Publication Data

US 2025/0147771 A1 May 8, 2025

(30) Foreign Application Priority Data

Nov. 8, 2023 (KR) ........................ 10-2023-0153937

(51) Int. Cl.
*G06F 9/4401* (2018.01)

(52) U.S. Cl.
CPC .................................. *G06F 9/4401* (2013.01)

(58) Field of Classification Search
None
See application file for complete search history.

(56) References Cited

U.S. PATENT DOCUMENTS

| | | | |
|---|---|---|---|
| 9,792,440 B1 | 10/2017 | Wang | |
| 11,042,635 B2 | 6/2021 | Sella et al. | |
| 11,494,310 B2 * | 11/2022 | Brokish | G06F 12/0246 |
| 11,500,993 B2 | 11/2022 | Mazzara, Jr. et al. | |
| 2008/0040596 A1 * | 2/2008 | Mai | G06F 9/4403 713/2 |
| 2018/0004979 A1 * | 1/2018 | Niell | G06F 21/70 |
| 2018/0074929 A1 * | 3/2018 | Kito | G06F 11/3051 |
| 2023/0069752 A1 | 3/2023 | Izzi et al. | |
| 2023/0205887 A1 | 6/2023 | Velivela | |

FOREIGN PATENT DOCUMENTS

| | | |
|---|---|---|
| JP | 2018-006782 A | 1/2018 |
| KR | 10-2084552 B1 | 4/2020 |
| WO | 2022-100903 A1 | 5/2022 |

* cited by examiner

*Primary Examiner* — Fahmida Rahman
(74) *Attorney, Agent, or Firm* — Fish & Richardson P.C.

(57) ABSTRACT

Provided is a method of operating an electronic device mounted on a vehicle, the method including identifying, by a storage controller, a security level corresponding to each of a plurality of electronic control units (ECUs), and providing, by the storage controller, based on the security levels, boot codes, which respectively correspond to a plurality of ECUs and are stored in a first non-volatile memory, to the respective ECUs.

20 Claims, 7 Drawing Sheets

ELECTRONIC DEVICE MOUNTED ON VEHICLE AND METHOD OF OPERATING THE SAME

CROSS-REFERENCE TO RELATED APPLICATION

This application is based on and claims priority under 35 U.S.C. § 119 to Korean Patent Application No. 10-2023-0153937, filed on Nov. 8, 2023, in the Korean Intellectual Property Office, the disclosures of which are incorporated by reference herein in their entirety.

BACKGROUND

The inventive concepts relate to an electronic device mounted on a vehicle, and more particularly, to an electronic device including a storage controller configured to provide a boot code to an electronic control unit (ECU) and a method of operating the electronic device.

Recently developed vehicles are basically equipped with various electronic control units (ECUs). As the number of ECUs mounted on vehicles increases, the number of individual storage controllers corresponding to respective ECUs also increases.

SUMMARY

The inventive concepts provides an electronic device having a structure in which one storage controller provides respective boot codes to a plurality of electronic control units (ECUs) according to security levels of the respective ECUs for improved multi-user performance with respect to the plurality of ECUs and a method of operating the electronic device.

The technical goals of the inventive concepts are not limited to the technical goals mentioned above, and other technical goals not mentioned will be clearly understood by one or ordinary skill in the art from descriptions below.

According to an aspect of the inventive concepts, there is provided a method of operating an electronic device mounted on a vehicle and including a plurality of electronic control units (ECUs), the method including identifying, by a storage controller, a security level corresponding to each of the plurality of ECUs; and providing to the plurality of ECUs, by the storage controller, boot codes based on the identified security levels, the boot codes respectively corresponding to the plurality of ECUs and being stored in a first non-volatile memory.

According to another aspect of the inventive concepts, there is provided an electronic device mounted on a vehicle, the electronic device including a plurality of ECUs, and a storage device shared by the plurality of ECUs, wherein the storage device includes a first non-volatile memory storing boot codes for the plurality of ECUs, and a storage controller configured to identify security levels corresponding to respective EUCs of the plurality of ECUs, and provide respective boot codes, of the boot codes which are stored in the first non-volatile memory to the respective ECUs based on the identified security levels.

According to another aspect of the inventive concepts, there is provided a storage device including a first non-volatile memory storing boot codes of a plurality of ECUs, and a storage controller configured to identify security levels respectively corresponding to respective ECUs of the plurality of ECUs, and provide, based on the security levels, respective boot codes, of the boot codes which are stored in the first non-volatile memory, to respective ECUs based on the identified security levels.

BRIEF DESCRIPTION OF THE DRAWINGS

Embodiments of the present inventive concepts will be more clearly understood from the following detailed description taken in conjunction with the accompanying drawings in which.

DETAILED DESCRIPTION OF THE EMBODIMENTS

Figure 1:
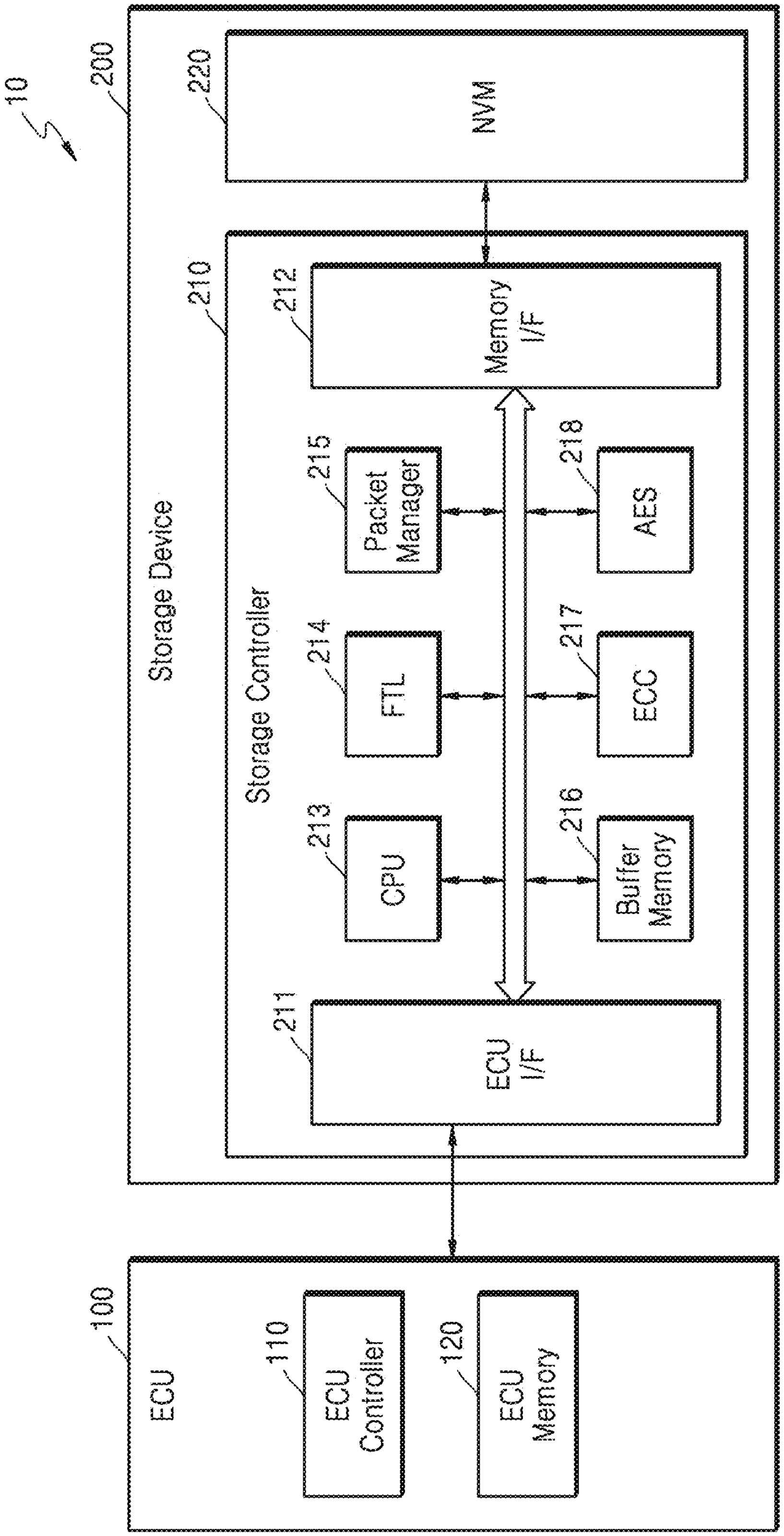
FIG. 1 is a block diagram of an electronic device according to at least one embodiment.

Hereinafter, embodiments will be described in detail with reference to the accompanying drawings. The same reference numerals are used to denote the same elements in the drawings, and repeated descriptions thereof are omitted.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Further, the functional blocks, including those described using terms like "unit" and/or "controller", that processes at least one function or operation, may be implemented in processing circuitry such as hardware, software, and/or a combination of hardware and software. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may additionally include electrical components such as at least one of transistors, resistors, capacitors, etc., and/or electronic circuits including said components.

FIG. 1 is a block diagram of an electronic device according to at least one embodiment.

An electronic device 10 may be mounted on a vehicle and may include an electronic control unit (ECU) 100 and a storage device 200. The storage device 200 may include a storage controller 210 and non-volatile memory (NVM) 220. Also, according to at least one embodiment, the ECU

100 may include an ECU controller 110 and an ECU memory 120. The ECU memory 120 may function as a buffer memory for temporarily storing data to be transmitted to the storage device 200 and/or data transmitted from the storage device 200.

The ECU 100 is an electronic control device including processing circuitry configured to control the overall operation of a vehicle. In at least one embodiment, the ECU 100 may collect and process measurement information from sensors to perform various functions or control a vehicle system.

For example, the ECU 100 may correspond to, but is not limited to, an engine control unit, a transmission control unit, a brake control unit, an airbag control unit, a fuel control unit, an entertainment system control unit, a driving assistance system control unit, an energy management unit, a vehicle safety system control unit, and/or the like.

The engine control unit is an ECU that is configured to control, improves, and/or optimizes the operation of a vehicle's engine and may control, e.g., fuel injection, air flow, ignition timing, exhaust gas treatment, and other engine elements. The transmission control unit is an ECU that is configured to manage and control a vehicle's transmission and may control, e.g., gear shifting, torque converter clutch control, etc. The brake control unit is configured to control a brake system, e.g., to manage pressure distribution needed for stable braking and safety functions (e.g., an anti-lock brake system (ABS) or an electric power steering (ESP)). The airbag control unit is configured to activate safety airbags in the event of an accident and analyze information from sensors in a vehicle to activate airbags at appropriate time points according to the intensity or the direction of an accident. The fuel control unit is configured to control fuel supply and a fuel mixture ratio to improve and/or optimize fuel economy and reduce exhaust gas. The entertainment system control unit is configured to manage, e.g., audio, video, and navigation systems within a vehicle. The driving assistance system control unit is used in an autonomous vehicle as a driving assistance system and may be configured to detect the surrounding environment and control a vehicle through radars, cameras, sensors, and/or the like. The energy management device is configured to manage a battery and control energy flow in a hybrid vehicle and/or an electric vehicle. The vehicle safety system control unit is configured to improve vehicle safety and may detect the driving environment through radars, cameras, sensors, and/or the like; and provides warnings to a driver and/or automatically engages safety procedures such as reducing the speed of the vehicle and/or turning off the engine.

In other words, the ECU 100 may be an electronic control device specialized for performing a particular function and/or functions of a vehicle.

The ECU 100 may be (and/or include) processing circuitry, and therefore may be implemented as software, hardware, and/or a combination of hardware and software. Also, in at least one embodiment, the ECU 100 may be implemented as a plurality of different ECUs (e.g., 100_1, 100_2, and 100_3 of FIG. 2A), and each ECU (e.g., 100_1 or 100_2, or 100_3 of FIG. 2A) may be specialized to perform a particular function.

The storage device 200 may include storage media for storing data according to a request from the ECU 100. As an example, the storage device 200 may include at least one of a solid state drive (SSD), an embedded memory, and a removable external memory. When the storage device 200 is an SSD, the storage device 200 may be a device complying with the non-volatile memory express (NVMe) standard. When the storage device 200 is an embedded memory or an external memory, the storage device 200 may be a device complying with the universal flash storage (UFS) standard or the embedded multi-media card (eMMC) standard. The ECU 100 and the storage device 200 may generate and transmit packets according to standard protocols employed thereby, respectively.

When the NVM 220 of the storage device 200 includes a flash memory, and the flash memory may include a 2D NAND memory array or a 3D (or vertical) NAND (VNAND) memory array. In another example, the storage device 200 may include various other types of non-volatile memories. For example, the storage device 200 may include a magnetic random-access memory (MRAM), a spin-transfer torque MRAM, a conductive bridging RAM (CBRAM), a ferroelectric RAM (FeRAM), a phase RAM (PRAM), a resistive RAM, and/or various other types of memories.

According to some embodiments, the ECU controller 110 and the ECU memory 120 may be implemented as separate semiconductor chips. Alternatively, according to some embodiments, the ECU controller 110 and the ECU memory 120 may be integrated on the same semiconductor chip. According to at least one embodiment, the ECU controller 110 may be any one of a plurality of modules included in an application processor, and the application processor may be implemented as a system-on-chip (SoC). Also, the ECU memory 120 may be an embedded memory provided in the application processor or a non-volatile memory and/or a memory module disposed outside the application processor.

The ECU controller 110 may manage an operation of storing data (e.g., write data) of a buffer region 121 in the NVM 220 and/or an operation of storing data (e.g., read data) of the NVM 220 in the buffer region 121.

The storage controller 210 may include an ECU interface 211, a memory interface 212, and a central processing unit (CPU) 213. The storage controller 210 may further include a flash translation layer (FTL) 214, a packet manager 215, a buffer memory 216, an error correction code (ECC) engine 217, and/or an advanced encryption standard (AES) engine 218. The storage controller 210 may further include a working memory (not shown) in which the FTL 214 is loaded, and operations for programming and reading data to and from a non-volatile memory may be controlled as the CPU 213 executes the FTL 214.

The ECU interface 211 is configured to transmit and receive packets to and from the ECU 100. A packet transmitted from the ECU 100 to the ECU interface 211 may include a command or data to be programmed to the NVM 220, and a packet transmitted from the ECU interface 211 to the ECU 100 may include a response to the command or data read from the NVM 220. The memory interface 212 may transmit data to be programmed to the NVM 220 to the NVM 220 or may receive data read from the NVM 220. The memory interface 212 may be implemented to comply with a standard protocol such as Toggle or ONFI.

The FTL 214 is configured to perform various functions like address mapping, wear-leveling, and garbage collection. The address mapping operation is an operation for translating a logical address received from the ECU 100 into a physical address used to store data in the NVM 220. The wear-leveling is a technique for preventing (and/or reducing) excessive degradation of a particular block by allowing blocks in the NVM 220 to be uniformly used and may be, for example, implemented through a firmware technology for balancing erase counts of physical blocks. The garbage collection is a technique for securing usable capacity in the NVM 220 by copying valid data of an old block to a new block and then erasing the old block.

The packet manager 215 is configured to generate packets according to a protocol of an interface negotiated with the ECU 100 or may parse various information from packets received from the ECU 100. Also, the buffer memory 216 may temporarily store data to be programmed to the NVM 220 or data to be read from the NVM 220. The buffer memory 216 may be a component provided in the storage controller 210, but may also be provided outside the storage controller 210.

The ECC engine 217 is configured to detect and correct an error on read data read from the NVM 220. For example, the ECC engine 217 may generate parity bits regarding write data to be written to the NVM 220, and such parity bits may be stored in the NVM 220 together with the write data. When data is read from the NVM 220, the ECC engine 217 may correct an error of read data using parity bits read from the NVM 220 together with the read data and output error-corrected read data.

The AES engine 218 is configured to perform at least one of an encryption operation and/or a decryption operation for data input to the storage controller 210 using, e.g., a symmetric-key algorithm.

When the electronic device 10 includes a plurality of ECUs, according to at least one embodiment, the storage controller 210 may check a security level corresponding to each of the plurality of ECUs and provide, based on the security level, a boot code corresponding to a corresponding ECU to the corresponding ECU, thereby enabling the corresponding ECU to comply with an appropriate automotive safety integrity level (ASIL) and improving multi-user performance.

Here, the ASIL may refer to a risk classification system related to the functional safety standards for vehicles, defined in, e.g., the international standard ISO 26262. Also, the boot code may refer to a code that causes the ECU 100 to start a boot process. For example, when power is applied to the ECU 100, the ECU 100 may execute a boot code to start a boot process. Also, the boot code may execute a boot loader, causing a boot loader to load and run an operating system image.

Below, a method of operating the electronic device 10 will be described in more detail with reference to FIGS. 2A and 3 to 5.

Figure 2A:
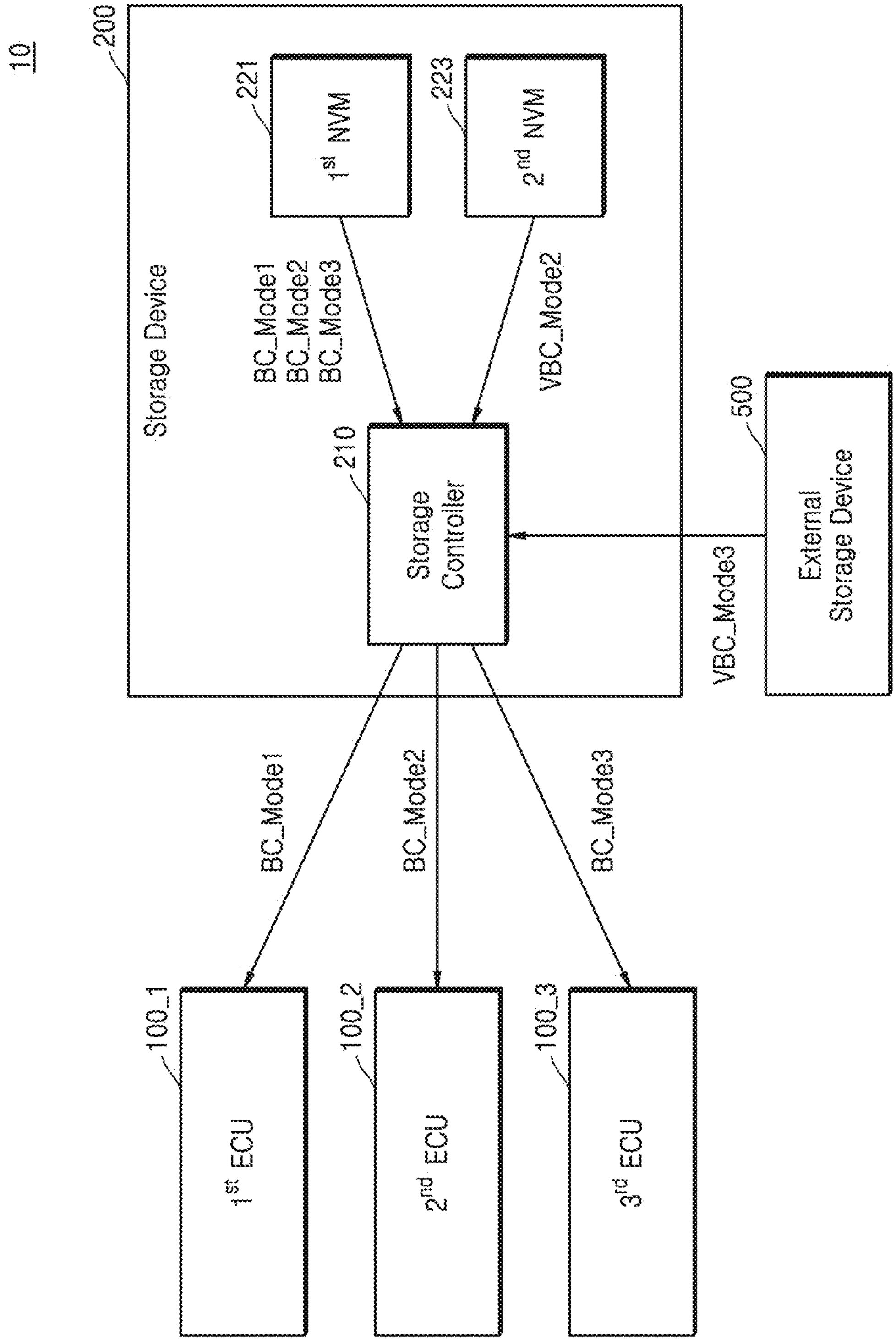
FIG. 2A is a block diagram showing an electronic device mounted on a vehicle, according to at least one embodiment.
Figure 2B:
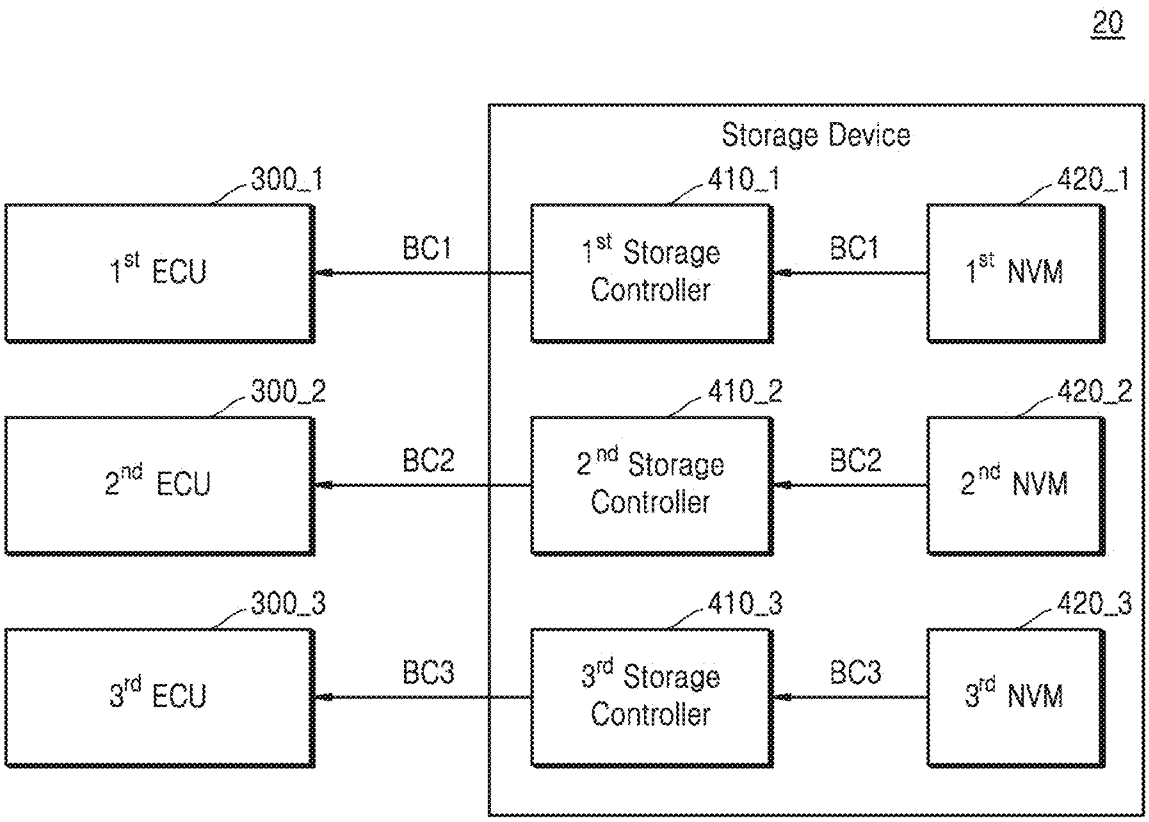
FIG. 2B is a block diagram showing an electronic device mounted on a vehicle, according to a comparative example.

FIG. 2A is a block diagram showing an electronic device mounted on a vehicle, according to at least one embodiment. FIG. 2B is a block diagram showing an electronic device mounted on a vehicle, according to a comparative example. Hereinafter, descriptions will be given with reference to FIG. 1, and repeated descriptions may be omitted.

Referring to FIG. 2A, the electronic device 10 mounted on a vehicle may include a first ECU 1001, a second ECU 100_2, a third ECU 100_3, the storage device 200, and an external storage device 500. The storage device 200 may include the storage controller 210, a first NVM 221, and a second NVM 223.

Here, the first ECU 100_1, the second ECU 100_2, and the third ECU 100_3 may each perform a particular function of a vehicle and may perform functions different from one another. Therefore, the boot code of the first ECU 1001, the boot code of the second ECU 100_2, and the boot code of the third ECU 1003 may be different from one another.

Also, security levels may differ for respective ECUs, and descriptions below will be given under the assumption that the security level of the first ECU 100_1 is a first level, the security level of the second ECU 100_2 is a second level, and the security level of the third ECU 100_3 is a third level. Also, descriptions will be given under the assumption that, the higher the security level of an ECU is, the more relevant the function of the corresponding ECU is to the safety of a passenger of a vehicle. Also, the number of ECUs included in the electronic device 10 is not limited to three, and a plurality of ECUs may each correspond to one of the first ECU 1001, the second ECU 100_2, and the third ECU 100_3 according to security levels. Also, the number of security levels is not limited to three, and, in some cases, there may be two security levels, or four or more security levels.

The storage controller 210 may check security levels corresponding to the plurality of ECUs (e.g., 100_1, 100_2, and 100_3, respectively) and, based on the security levels, provide the corresponding (or respective) boot codes (e.g., BC_Mode1, BC_Mode2, and BC_Mode3, which are stored in the first NVM 221 and respectively correspond to the plurality of ECUs 100_1, 100_2, and 100_3) to the plurality of ECUs 100_1, 100_2, and 100_3, respectively. The number of storage controllers 210 included in the storage device 200 is not limited to one, and a plurality of storage controllers may provide boot codes to the first ECU 100_1, the second ECU 1002, and the third ECU 100_3, respectively. Also, the number of first NVMs 221 for storing the boot codes BC_Mode1, BC_Mode2, and BC_Mode3 respectively corresponding to the plurality of ECUs 100_1, 100_2, and 100_3 is not limited to one, and a plurality of first NVMs 221 may be provided.

In other words, the at least one storage controller 210 may provide boot codes of all ECUs in a vehicle, stored in at least one first NVM 221, to the respective ECUs based on security levels of the respective ECUs.

Meanwhile, a structure in which boot codes of all ECUs in a vehicle are stored in at least one first NVM 221 and one storage controller 210 provides the boot codes from the at least one first NVM 221 to respective ECUs may be referred to as a shared storage structure for vehicles.

Here, according to some embodiments, the storage controller 210 may include a plurality of storage controllers.

According to at least one embodiment, one storage controller 210 may provide boot codes of all ECUs in a vehicle, stored in at least one first NVM 221, to the respective ECUs based on security levels of the respective ECUs.

In other words, according to at least one embodiment, one storage controller 210 included in the electronic device 10 having a shared storage structure for vehicles may provide boot codes of all ECUs within a vehicle, stored in the at least one first NVM 221, to the respective ECUs based on the security levels of the respective ECUs. A method of providing, by the storage controller 210, boot codes of all ECUs within a vehicle, stored in the at least one first NVM 221, to the respective ECUs based on the security levels of the respective ECUs will be described in detail with reference to FIGS. 3 to 6.

Referring further to FIG. 2B, an electronic device 20 mounted on a vehicle according to the comparative example may include a first ECU 300_1, a second ECU 300_2, a third ECU 300_3, a first storage controller 410_1 corresponding to the first ECU 300_1, a second storage controller 4102 corresponding to the second ECU 300_2, a third storage controller 410_3 corresponding to the third ECU 300_3, a first NVM 420_1 corresponding to the first ECU 300_1, a second NVM 420_2 corresponding to the second ECU 300_2, and a third NVM 420_3 corresponding to the third ECU 300_3.

In the electronic device 20 mounted on a vehicle according to the comparative example, each storage controller corresponding to each ECU independently provides a boot code to a corresponding ECU regardless of the security level of the corresponding ECU. Referring to FIG. 2B, the first storage controller 4101 provides a boot code BC1 stored in the first NVM 420_1 to the first ECU 3001, the second storage controller 4102 provides a boot code BC2 stored in the second NVM 420_2 to the second ECU 300_2, and the third storage controller 410_3 provides a boot code BC3 stored in the third NVM 420_3 to the third ECU 300_3.

In the comparative example, since a storage controller corresponding to each ECU provides a boot code, stored in each of the NVMs, to each ECU, as compared to the case in which one storage controller provides boot codes to a plurality of ECUs, resources (e.g., power consumption or the space occupied by a plurality of storage controllers) may be wasted. Also, in the comparative example, since a storage controller corresponding to each ECU independently provides a boot code to a corresponding ECU regardless of the security level of the corresponding ECU, each storage controller may not be able to comply with an ASIL appropriate for a corresponding ECU.

Referring back to FIG. 2A, one storage controller 210 included in the electronic device 10 having a shared storage structure for vehicles may provide boot codes of all ECUs within a vehicle, stored in the at least one first NVM 221, to the respective ECUs based on the security levels of the respective ECUs. As a result, according to the inventive concepts, the storage controller 210 may provide boot codes respectively corresponding to a plurality of ECUs to the respective ECUs based on the security levels, thereby making each ECU to comply with an appropriate ASIL. Also, according to the inventive concepts, by reducing resources (e.g., power consumption or the space occupied by a plurality of storage controllers) for a plurality of storage controllers through a shared storage structure for vehicles, multi-user performance for a plurality of ECUs may be improved.

Figure 3:
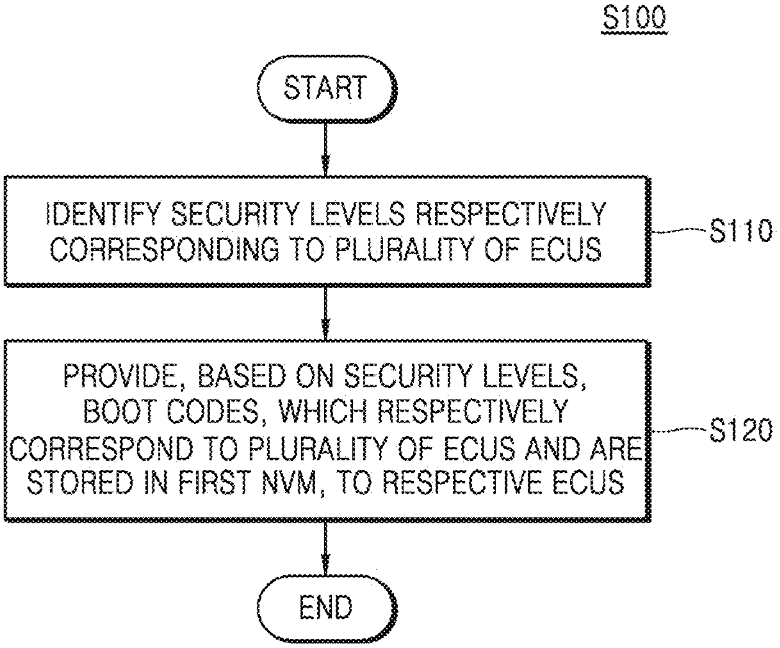
FIG. 3 is a flowchart of a method of operating an electronic device mounted on a vehicle, according to at least one embodiment.

FIG. 3 is a flowchart of a method of operating an electronic device mounted on a vehicle, according to at least one embodiment. In detail, FIG. 3 is a diagram for describing the method of operating the electronic device 10 of FIGS. 1 and 2A. Hereinafter, descriptions will be given with reference to FIGS. 1 and 2A, and repeated descriptions will be omitted.

Referring to FIG. 3, a method S100 of operating the electronic device 10 may include operations S110 and S120.

In operation S110, the storage controller 210 may check security levels respectively corresponding to a plurality of ECUs.

According to some embodiments, the security levels respectively corresponding to the plurality of ECUs may be determined in advance according to ASILs.

According to functions of ECUs, an ASIL corresponding to each of the plurality of ECUs may correspond to one of ASIL A, ASIL B, ASIL C, and ASIL D. Here, ASIL A may represent the lowest requirement and ASIL D may represent the highest requirement.

The plurality of ECUs may each be demanded to satisfy one of ASIL A, ASIL B, ASIL C, and ASIL D at the time of design, and/or the security level of an ECU may be determined in advance according to an ASIL. For example, the security level corresponding to an ECU of ASIL A may be determined as a first level, the security level corresponding to an ECU of ASIL B or ASIL C may be determined as a second level, and the security level corresponding to an ECU of ASIL D may be determined as a third level. Alternatively, the security level corresponding to an ECU of ASIL A may be determined as a first level, the security level corresponding to an ECU of ASIL B may be determined as a second level, the security level corresponding to an ECU of ASIL C may be determined as a third level, and the security level corresponding to an ECU of ASIL D may be determined as a fourth level.

In operation S120, the storage controller 210 may provide boot codes, which respectively correspond to a plurality of ECUs and are stored in a first NVM, to the respective ECUs based on the security levels. Detailed descriptions thereof will be given later with reference to FIG. 6.

Meanwhile, the boot code may refer to a code that causes the corresponding ECU (e.g., 100 and/or 100_1 to 100_3) to start a boot process. For example, when power is applied to the ECU 100, the ECU 100 may execute a boot code to start a boot process. Also, the boot code may execute a boot loader, causing a boot loader to load and run an operating system image. The boot code will be described in detail with reference to FIG. 4.

Figure 4A:
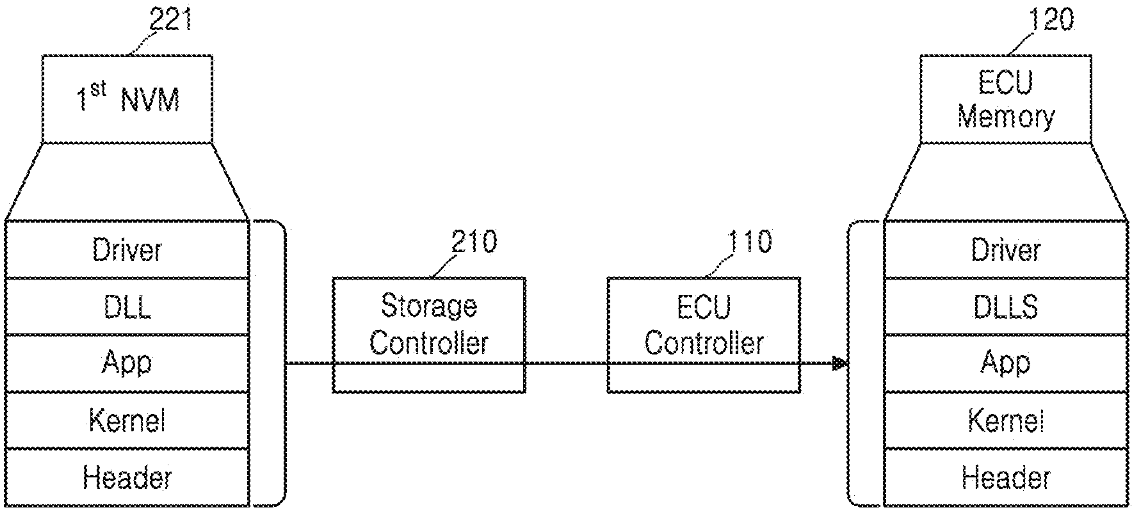
FIGS. 4A and 4B are diagrams for describing boot codes according to at least one embodiment.
Figure 4B:
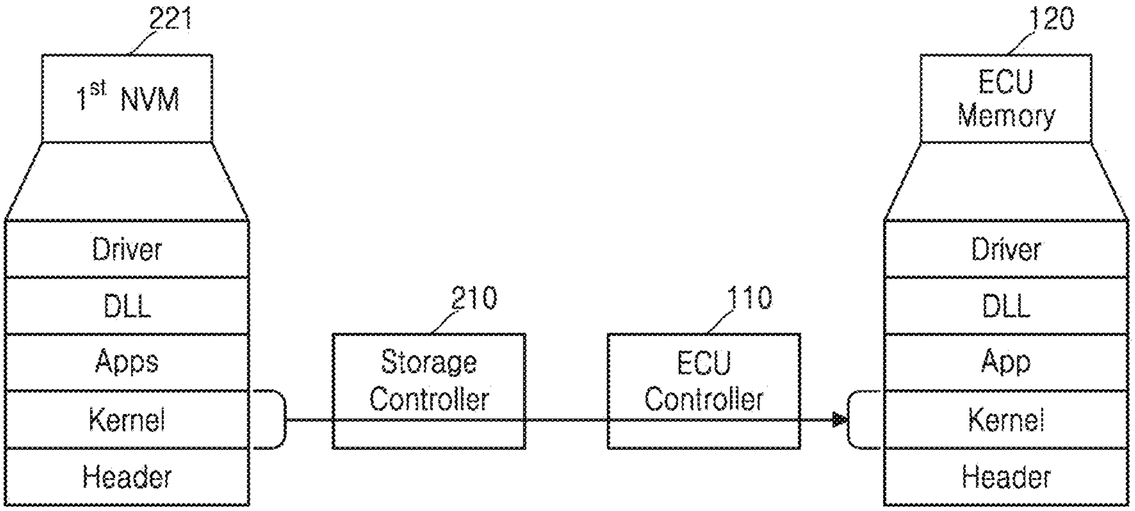

FIGS. 4A and 4B are diagrams for describing boot codes according to at least one embodiment. In detail, FIG. 4A is a diagram for describing a boot code according to full boot-up, and FIG. 4B is a diagram for describing a boot code for subsequent boot-up. Hereinafter, descriptions will be given with reference to FIGS. 1 and 2, and repeated descriptions will be omitted.

In a shared storage structure for vehicles, at least one first NVM 221 may store boot codes of all ECUs in a vehicle, and at least one storage controller 210 may provide the boot codes stored in the at least one first NVM 221 to the corresponding ECUs, respectively.

Referring to FIGS. 4A and 4B, according to at least one embodiment, a boot code may include driver data Driver, dynamic-link library (DLL) data DLL, application data App, kernel data Kernel, header data Header, and/or the like.

Here, the driver data Driver may be data related to a driver, which is a software component that manages and controls interaction between hardware and an operating system (OS), the DLL data DLL may be data related to a library of code and data that may be shared by a plurality of programs, the application data App may be data related to a program that performs a particular function, the kernel data Kernel may be data related to a kernel that manages and controls hardware components used to run programs, and the header data Header may be data related to a header file that allows a plurality of codes to share the same declaration and structure.

For example, a method of booting an ECU may include a full boot-up and/or a subsequent boot-up.

A full boot-up means that an ECU is completely turned off and then rebooted and may include a process where an ECU is re-started completely from its initial state and all of hardware and software components of the ECU are initialized. For example, a full boot-up may be performed when an ECU is re-started after power is completely lost or the ECU is completely turned off.

Referring to FIG. 4A, the storage controller 210 may provide a boot code of an ECU (e.g., 100 and/or 100_1 to 100_3) stored in a first NVM 221 to the ECU controller 110, and the ECU controller 110 may execute a boot loader based on the boot code to load an OS image into the ECU memory 120 and execute the OS image.

According to some embodiments, a boot code provided by the storage controller 210 to the ECU controller 110 during a full boot-up may include the driver data Driver, the DLL data DLL, the application data App, the kernel data Kernel, the header data Header, and/or the like.

A subsequent boot-up means rebooting an ECU after the ECU has been booted at least once and may include a process of performing a new operation while maintaining the previous state and configuration of an ECU and/or a process of applying an update.

Referring to FIG. 4B, the storage controller 210 may provide a boot code of an ECU (e.g., 100 and/or 100_1 to 100_3) stored in a first NVM (e.g., 220 and/or 221) to the ECU controller 110, and the ECU controller 110 may execute a boot loader based on the boot code to re-start a configuration, data, or an operation of a previous state on the ECU memory 120.

According to some embodiments, a boot code provided by the storage controller 210 to the ECU controller 110 during a subsequent boot-up may include the kernel data Kernel.

Figure 5A:
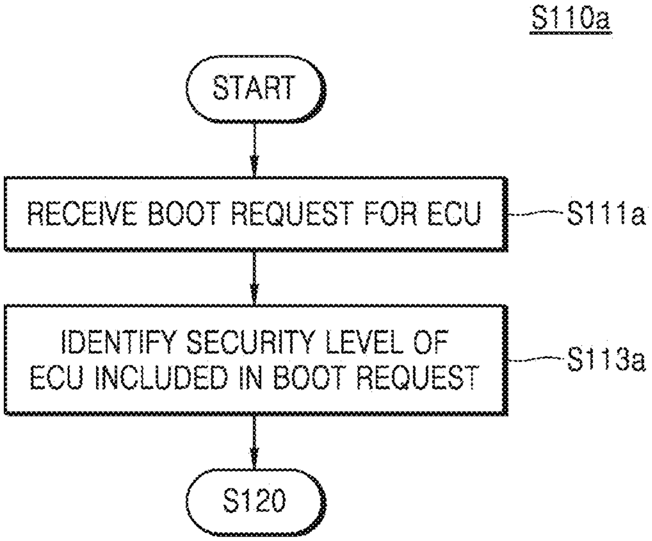
FIGS. 5A and 5B are flowcharts of a method of operating an electronic device, according to at least one embodiment.
Figure 5B:
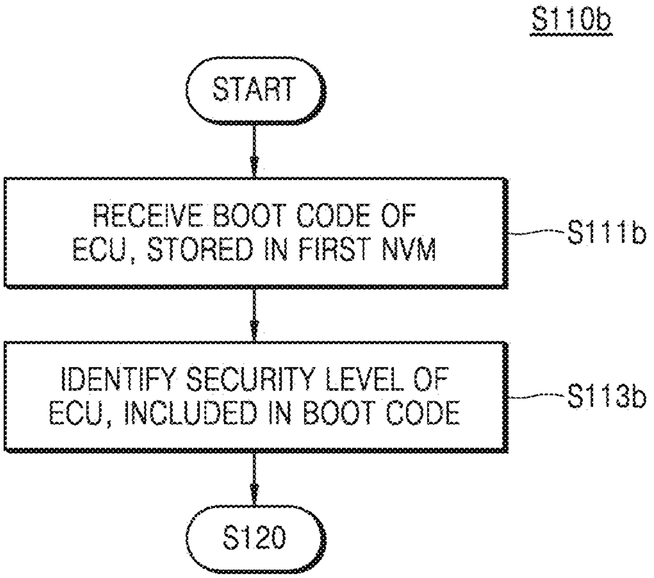

FIGS. 5A and 5B are flowcharts of a method of operating an electronic device, according to at least one embodiment. In detail, FIGS. 5A and 5B are flowcharts for describing examples of operation S110 of FIG. 3 in more detail. Hereinafter, descriptions will be given with reference to FIGS. 1 to 4B, and repeated descriptions will be omitted.

Referring to FIGS. 5A and 5B, operation S110 of FIG. 3 may include operation S110*a* or operation S110*b*.

Referring to FIGS. 1 and 5A, operation S110*a* may include operations S111*a* and S113*a*.

In operation S111*a*, the storage controller 210 may receive a boot request for the ECU 100. For example, when power is applied to the ECU 100, the ECU controller 110 may provide a boot request for the ECU 100 to the storage controller 210.

In operation S113*a*, the storage controller 210 may, in response to receiving the boot request, check the security level of the ECU 100 included in the received boot request. Afterwards, the method may proceed to operation S120. According to some embodiments, the security levels of the ECU 100 may be determined in advance according to an ASIL.

Referring to FIGS. 2 and 5B, operation S110*b* may include operations S111*b* and S113*b*.

In operation S111*b*, the storage controller 210 may receive a boot code of an ECU stored in the first NVM 221. For example, in response to a boot request for the first ECU 100_1, the storage controller 210 may receive a boot code BC_Mode1 corresponding to the first ECU 100_1 stored in the first NVM 221.

In operation S113*b*, the storage controller 210 may, in response to receiving the boot code, check the security level of an ECU included in the received boot code. Afterwards, the method may proceed to operation S120. For example, the storage controller 210 may check the security level of the first ECU 100_1, which is included in the boot code BC_Mode1 and corresponds to the first ECU 100_1.

According to some embodiments, the security levels of the first ECU 100_1 may be determined in advance according to an ASIL.

Figure 6A:
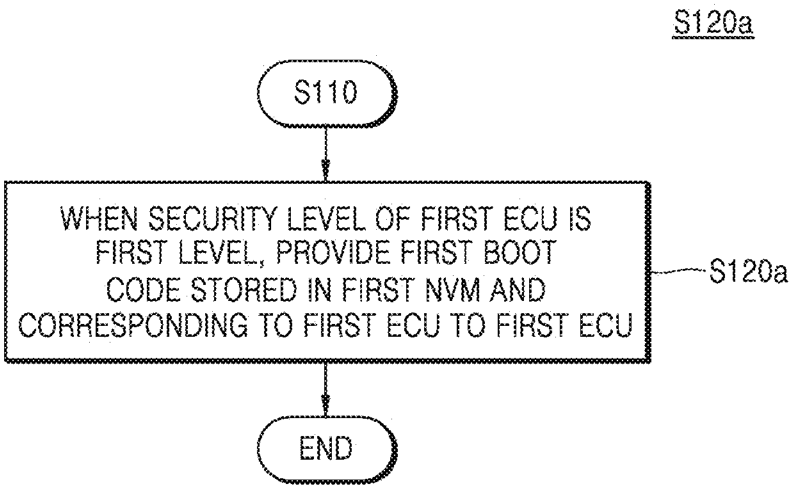
FIGS. 6A, 6B, and 6C are flowcharts of a method of operating an electronic device, according to at least one embodiment.
Figure 6B:
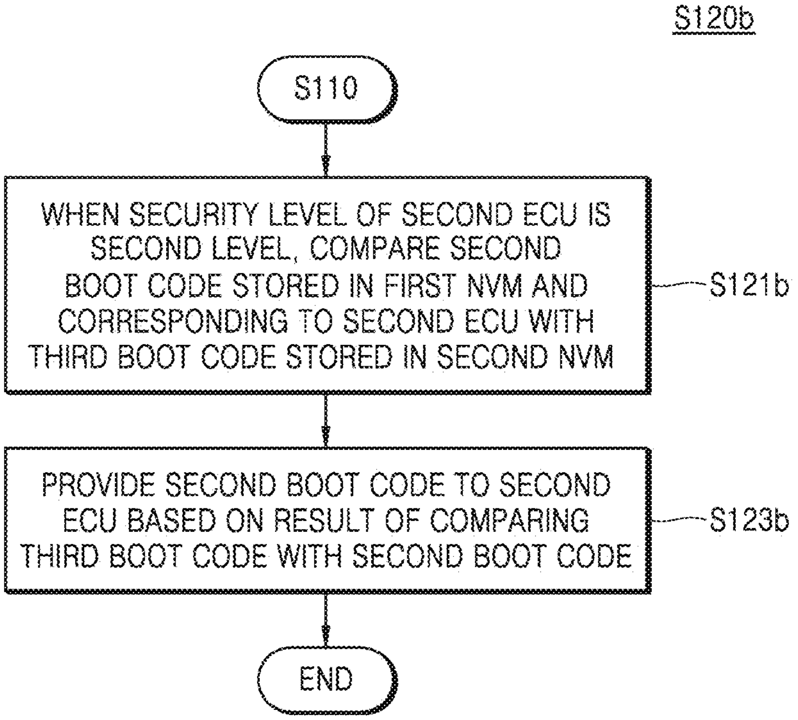
Figure 6C:
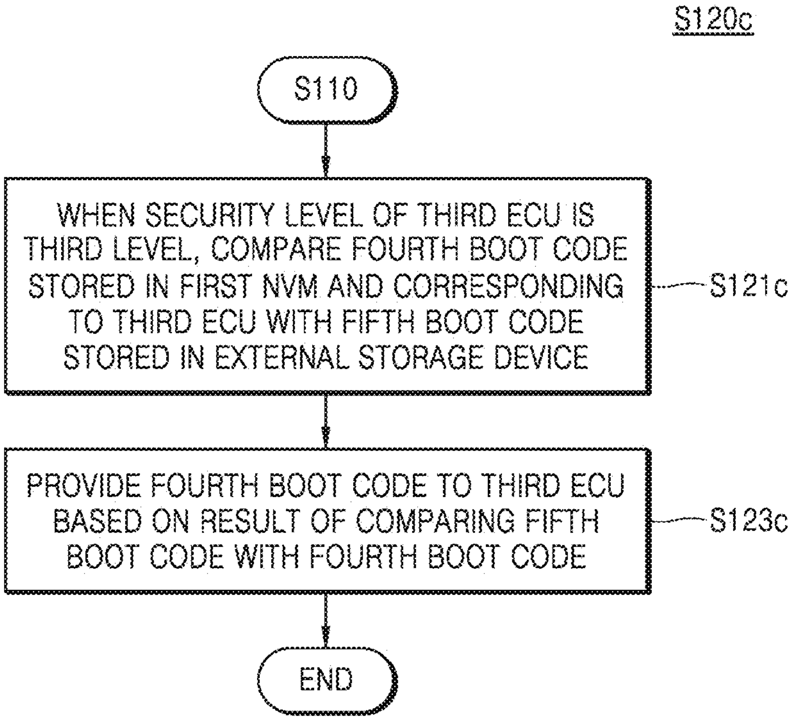

FIGS. 6A, 6B, and 6C are flowcharts of a method of operating an electronic device, according to at least one embodiment. In detail, FIGS. 6A, 6B, and 6C are flowcharts for describing examples of operation S120 of FIG. 3 in more detail. Hereinafter, descriptions will be given with reference to FIGS. 1 to 5, and repeated descriptions will be omitted.

Referring to FIGS. 6A, 6B, and 6C, operation S120 of FIG. 3 may include operation S120*a*, operation S120*b*, or operation S120*c*.

According to at least one embodiment, at least one storage controller 210 included in the electronic device 10 having a shared storage structure for vehicles may provide boot codes of all ECUs within a vehicle, stored in the at least one first NVM 221, to the respective ECUs based on the security levels of the respective ECUs. Descriptions will be given below under the assumption that the security level of the first ECU 100_1 is a first level, the security level of the second ECU 100_2 is a second level, and the security level of the third ECU 100_3 is a third level. Also, descriptions will be given under the assumption that, the higher the security level of an ECU is, the more relevant the function of the corresponding ECU is to the safety of a passenger of a vehicle. Also, as noted above, the number of ECUs included in the electronic device 10 and the security levels are not limited to three, and a plurality of ECUs may each correspond to one of the first ECU 100_1, the second ECU 100_2, and the third ECU 100_3 according to security levels.

Referring to FIGS. 2A and 6A, in operation S120*a*, when the security level of the first ECU 100_1 is the first level, the storage controller 210 may provide the first boot code BC_Mode1 stores a first ECU, which is stored in the first NVM 221 and corresponds to the first ECU 100_1, to the first ECU 100_1.

For example, since the security level of the first ECU 100_1 is the first level (which is the lowest level) the storage controller 210 may provide the first boot code BC_Mode1, which is stored in the first NVM 221 and corresponds to the first ECU 1001, without a comparison.

Referring to FIGS. 2A and 6B, operation S120*b* may include operations S121*b* and S123*b*.

In operation S121*b*, when the security level of the second ECU 100_2 is the second level, the storage controller 210 may compare a second boot code BC_Mode2, which is stored in the first NVM 221 and corresponds to the second ECU 100_2, with a third boot code VBC_Mode2 stored in the second NVM 223. Here, the third boot code VBC_Mode2 stored in the second NVM 223 may correspond to the second ECU 100_2.

For example, to compare with a boot code of an ECU stored in the first NVM 221, the second NVM 223 isolated from the first NVM 221 may store an additional boot code corresponding to the corresponding ECU.

According to some embodiments, when the security level of the second ECU 100_2 is the second level, the storage controller 210 may compare the second boot code BC_Mode2, which is stored in the first NVM 221 and corresponds to the second ECU 100_2, with the third boot code VBC_Mode2 stored in the second NVM 223. For example, a method for verifying the data integrity of the second boot code BC_Mode2 by comparing the second boot code BC_Mode2 with the third boot code VBC_Mode2 may include a checksum method, a cyclic redundancy check (CRC) method, etc.; and, through such verification methods, forgery or alteration of data may be identified. Alternatively, to compare the second boot code BC_Mode2 with the third boot code VBC_Mode2, the signature of the second boot code BC_Mode2 and the signature of the third boot code VBC_Mode2 may be generated and stored by using the hash value of the second boot code BC_Mode2 and the hash value of the third boot code VBC_Mode2, and then the data integrity and forgery, or alteration of data may be identified by comparing the signature of the second boot code BC_Mode2 with the signature of the third boot code VBC_Mode2 during a boot up. Also, the method of comparing the second boot code BC_Mode2 and the third boot code VBC_Mode2 is not limited to signature comparison using checksum, CRC, and hash values, and various other methods may be employed.

In operation S123*b*, the storage controller 210 may provide the second boot code BC_Mode2 to the second ECU 100_2 based on a result of comparing the third boot code VBC_Mode2 with the second boot code BC_Mode2.

For example, the storage controller 210 may determine whether a boot process or a boot operation of the second ECU 100_2 may be performed normally based on a difference between the second boot code BC_Mode2 and the third boot code VBC_Mode2.

When it is determined that the boot process or the boot operation of the second ECU 100_2 is to be performed normally, the storage controller 210 may provide the second boot code BC_Mode2 to the second ECU 100_2.

Referring to FIGS. 2A and 6C, operation S120*c* may include operations S121*c* and S123*c*.

In operation S121*c*, when the security level of the third ECU 100_3 is the third level, the storage controller 210 may compare a fourth boot code BC_Mode3, which is stored in the first NVM 221 and corresponds to the third ECU 100_3, with a fifth boot code VBC_Mode3 stored in the external storage device 500. Here, the fifth boot code VBC_Mode3 stored in the external storage device 500 may correspond to the third ECU 100_3.

For example, to compare with a boot code of an ECU, stored in the first NVM 221, the external storage device 500 isolated from the first NVM 221 may store an additional boot code corresponding to the corresponding ECU.

According to some embodiments, when the security level of the third ECU 100_3 is the third level, the storage controller 210 may compare the fourth boot code BC_Mode3, which is stored in the first NVM 221 and corresponds to the third ECU 1003, with the fifth boot code VBC_Mode3 stored in the external storage device 500. For example, a method for verifying the data integrity of the fourth boot code BC_Mode3 by comparing the fourth boot code BC_Mode3 with the fifth boot code VBC_Mode3 may include a checksum method, a cyclic redundancy check (CRC) method, etc.; and, through such verification methods, forgery or alteration of data may be identified. Alternatively, to compare the fourth boot code BC_Mode3 with the fifth boot code VBC_Mode3, the signature of the fourth boot code BC_Mode3 and the signature of the fifth boot code VBC_Mode3 may be generated and stored by using the hash value of the fourth boot code BC_Mode3 and the hash value of the fifth boot code VBC_Mode3, and then the data integrity and forgery, or alteration of data may be identified by comparing the signature of the fourth boot code BC_Mode3 with the signature of the fifth boot code VBC_Mode3 during a boot up. Also, the method of comparing the fourth boot code BC_Mode3 and the fifth boot code VBC_Mode3 is not limited to signature comparison using checksum, CRC, and hash values, and various other methods may be employed.

In operation S123*c*, the storage controller 210 may provide the fourth boot code BC_Mode3 to the third ECU 100_3 based on a result of comparing the fifth boot code VBC_Mode3 with the fourth boot code BC_Mode3.

For example, the storage controller 210 may determine whether a boot process or a boot operation of the third ECU 100_3 may be performed normally based on a difference between the fifth boot code VBC_Mode3 and the fourth boot code BC_Mode3.

When it is determined that the boot process or the boot operation of the third ECU 100_3 is to be performed normally, the storage controller 210 may provide the fourth boot code BC_Mode3 to the third ECU 100_3.

According to the inventive concepts, the storage controller 210 may provide boot codes respectively corresponding to a plurality of ECUs to the respective ECUs based on the security levels, thereby making each ECU to comply with an appropriate ASIL. Also, according to the inventive concepts, by reducing resources (e.g., power consumption or the space occupied by a plurality of storage controllers) for a plurality of storage controllers through a shared storage structure for vehicles, multi-user performance for a plurality of ECUs may be improved.

While the inventive concepts have been particularly shown and described with reference to embodiments thereof, it will be understood that various changes in form and details may be made therein without departing from the spirit and scope of the following claims.

What is claimed is:

1. A method of operating an electronic device mounted on a vehicle and including a plurality of electronic control units (ECUs) and a storage device, the storage device including a storage controller, a first non-volatile memory in communication with the storage controller, and a second non-volatile memory in communication with the storage controller, the second non-volatile memory being isolated from the first non-volatile memory, the method comprising:

identifying, by the storage controller, a security level corresponding to each of the plurality of ECUs, wherein the plurality of ECUs includes at least a first ECU associated with a first security level and a second ECU associated with a second security level above the first security level;

providing, by the storage controller, a first boot code stored in the first non-volatile memory and corresponding to the first ECU, to the first ECU;

comparing, by the storage controller, a second boot code stored in the first non-volatile memory and corresponding to the second ECU, with a boot code stored in a memory isolated from the first non-volatile memory, wherein the first boot code corresponds to the first security level and the second boot code corresponds to the second security level; and providing, by the storage controller, the second boot code to the second ECU according to a result of the comparing.

2. The method of claim 1, wherein the plurality of ECUs further includes a third ECU associated with a third security level below the first security level, the method further comprising providing, by the storage controller, a third boot code stored in the first non-volatile memory and corresponding to the third ECU, to the third ECU, without comparing the third boot code with any other boot code.

3. The method of claim 1, wherein the memory isolated from the first non-volatile memory is the second non-volatile memory within the storage device.

4. The method of claim 1, wherein the memory isolated from the first non-volatile memory is an external storage device external to and isolated from the storage device.

5. The method of claim 1, wherein the security level corresponding to each of the plurality of ECUs is determined in advance based on automotive safety integrity levels (ASILs).

6. The method of claim 1, wherein the identifying, by the storage controller, the security level comprises receiving, by the storage controller, a boot request for an ECU, of the plurality of ECUs, and identifying, by the storage controller, a security level of the ECU included in the boot request.

7. The method of claim 1, wherein the identifying, by the storage controller, the security level comprises receiving, by the storage controller, a boot code of an ECU, of the plurality of ECUs, and identifying, by the storage controller, a security level of the ECU included in the received boot code based on the boot codes stored in the first non-volatile memory.

8. An electronic device mounted on a vehicle, the electronic device comprising:

a plurality of electronic control units (ECUs) including at least a first ECU associated with a first security level and a second ECU associated with a second security level above the first security level;

a storage device shared by the plurality of ECUs; and an external storage device external to and isolated from the storage device, wherein the storage device comprises a first non-volatile memory storing boot codes for the plurality of ECUs, the boot codes corresponding to respective security levels of the plurality of ECUs, a second non-volatile memory isolated from the first non-volatile memory, and a storage controller configured to provide a first boot code stored in the first non-volatile memory and corresponding to the first ECU, to the first ECU;

compare a second boot code stored in the first non-volatile memory and corresponding to the second ECU, with a boot code stored in a memory isolated from the first non-volatile memory; and provide the second boot code to the second ECU according to a result of the comparing.

9. The electronic device of claim 8, wherein the plurality of ECUs further includes a third ECU associated with a third security level below the first security level, and wherein the storage controller is further configured to provide a third boot code stored in the first non-volatile memory and corresponding to the third ECU, to the third ECU, without comparing the third boot code with any other boot code.

10. The electronic device of claim 8, wherein the memory isolated from the first non-volatile memory is the second non-volatile memory within the storage device.

11. The electronic device of claim 8, wherein the memory isolated from the first non-volatile memory is the external storage device.

12. The electronic device of claim 8, wherein the security level corresponding to each of the plurality of ECUs is determined in advance based on automotive safety integrity levels (ASILs).

13. The electronic device of claim 8, wherein the storage controller is configured to receive a boot request for an ECU, of the plurality of ECUs, and identify a security level of the ECU included in the boot request.

14. The electronic device of claim 8, wherein the storage controller is configured to receive a boot code corresponding to an ECU of the plurality of ECUs, and identify a security level of the ECU included in the received boot code based on the boot codes stored in the first non-volatile memory.

15. A storage device comprising:

a first non-volatile memory storing boot codes of a plurality of electronic control units (ECUs), the plurality of ECUs including at least a first ECU associated with a first security level and a second ECU associated with a second security level above the first security level, the boot codes corresponding to respective security levels of the plurality of ECUs;

a second non-volatile memory isolated from the first non-volatile memory; and a storage controller configured to identify security levels respectively corresponding to respective ECUs of the plurality of ECUs, and provide a first boot code stored in the first non-volatile memory and corresponding to the first ECU, to the first ECU;

compare a second boot code stored in the first non-volatile memory and corresponding to the second ECU, with a boot code stored in a memory isolated from the first non-volatile memory; and provide the second boot code to the second ECU according to a result of the comparing.

16. The storage device of claim 15, wherein the plurality of ECUs further includes a third ECU associated with a third security level below the first security level, and wherein the storage controller is further configured to provide a third boot code stored in the first non-volatile memory and corresponding to the third ECU, to the third ECU, without comparing the third boot code with any other boot code.

17. The storage device of claim 15, wherein the memory isolated from the first non-volatile memory is the second non-volatile memory within the storage device.

18. The storage device of claim 15, wherein the memory isolated from the first non-volatile memory is an external storage device external to and isolated from the storage device.

19. The storage device of claim 15, wherein the security level corresponding to each of the plurality of ECUs is determined in advance based on automotive safety integrity levels (ASILs).

20. The storage device of claim 15, wherein the storage controller is configured to receive a boot code corresponding to an ECU of the plurality of ECUs, and identify a security level of the ECU included in the received boot code based on the boot codes stored in the first non-volatile memory.

* * * * *